US011947318B2

(12) United States Patent
Ummel et al.

(10) Patent No.: US 11,947,318 B2
(45) Date of Patent: Apr. 2, 2024

(54) DEWAR DEVICE COMPRISING AN ACTUATION DEVICE

(71) Applicant: Omega SA, Biel/Bienne (CH)

(72) Inventors: Antoine Ummel, Neuchâtel (CH); Serge Droz, Bôle (CH)

(73) Assignee: Omega SA, Biel/Bienne (CH)

( * ) Notice: Subject to any disclaimer, the term of this patent is extended or adjusted under 35 U.S.C. 154(b) by 86 days.

(21) Appl. No.: 17/658,147

(22) Filed: Apr. 6, 2022

(65) Prior Publication Data

US 2022/0404775 A1 Dec. 22, 2022

(30) Foreign Application Priority Data

Jun. 18, 2021 (EP) .................................... 21180254

(51) Int. Cl.
*G04B 37/02* (2006.01)
*G04B 39/02* (2006.01)

(52) U.S. Cl.
CPC ............. *G04B 37/02* (2013.01); *G04B 39/02* (2013.01)

(58) Field of Classification Search
CPC ........ G04G 17/00; G04G 17/02; G04G 17/08; G04G 17/083
See application file for complete search history.

(56) References Cited

U.S. PATENT DOCUMENTS 3,030,763 A * 4/1962 Klingenberg .......... G04B 39/02 368/291
3,740,944 A 6/1973 Chopard
3,759,033 A 9/1973 Jeanmonod
7,001,064 B2 * 2/2006 Finazzi ................. G04B 3/048 368/216

FOREIGN PATENT DOCUMENTS

CH 716 913 A2 6/2021
CN 205176489 U 4/2016
JP 2009-229167 A 10/2009
WO WO 2018/215491 A1 11/2018

OTHER PUBLICATIONS

European Search Report dated Dec. 3, 2021 in European Application 211802541 filed on Jun. 18, 2021 (with English Translation of Categories of cited documents), 3 pages.

* cited by examiner

*Primary Examiner* — Renee S Luebke
*Assistant Examiner* — Matthew Hwang
(74) *Attorney, Agent, or Firm* — Oblon, McClelland, Maier & Neustadt, L.L.P.

(57) ABSTRACT

A Dewar device for mechanical and/or functional components of a watch, this device including a wristlet, a case including a chamber wherein a case of the watch is capable of being disposed in such a way that a glass of this case is arranged facing a glass of a set of elements of the case defining this chamber, at least one fastening device fastening this watch case in this chamber of the case while maintaining it distant from all of the elements of the case defining this chamber, and a device for actuating at least one push button by the angular movement of a free end of at least one lever element of this device relative to the case, this at least one lever element having another end movably fastened to this case.

14 Claims, 2 Drawing Sheets

DEWAR DEVICE COMPRISING AN ACTUATION DEVICE

CROSS-REFERENCE TO RELATED APPLICATION

This application claims priority to European Patent Application No. 21180254.1 filed on Jun. 18, 2021, the entire disclosure of which is hereby incorporated herein by reference.

TECHNICAL FIELD OF THE INVENTION

The present invention relates to a Dewar device for mechanical and/or functional components of a watch, the device comprising a device for actuating at least one push button of a watch arranged in a chamber of this Dewar device.

TECHNOLOGICAL BACKGROUND

A watch and in particular an electronic watch conventionally comprises a wristlet and a watch case including several electric or electronic components. It is known in the prior art that some of these components do not support extreme temperatures, and stop functioning correctly at these temperatures. Typically, the LCD liquid crystal displays using light emitting diodes or quartz tolerate temperatures not exceeding approximately 80° C. (degrees Celsius), and not going below 0° C. However, in particular environments for example such as space or lunar missions, the temperatures can frequently reach values of approximately substantially −150° C. to +125° C.

There is therefore a need to be able to use a watch in particular an electronic watch in environments in which there can be such extreme temperatures.

SUMMARY OF THE INVENTION

The invention relates to a Dewar device for mechanical and/or functional components of a watch, said device including: a wristlet, a case comprising a chamber in which a case of the watch is capable of being disposed in such a way that a glass of said watch case is arranged facing a glass of a set of elements of the case defining this chamber, at least one fastening device fastening said watch case in said chamber of the case while maintaining it distant from all of the elements of the case defining this chamber, and a device for actuating at least one push button by the angular movement of a free end of at least one lever element of said device relative to the case, said at least one lever element having another end movably fastened to said case.

In other embodiments:

- said actuation device comprises said at least one lever element which is configured to actuate said at least one push button by angular movement of the free end of this said at least one lever element relative to the case, said at least one lever element having its other end movably fastened to said case;
- said other end of this said at least one lever element is movably fastened to a horn of a pair of horns of said case;
- said other end of said at least one lever element is movably fastened to a crown of said case;
- said actuation device comprises at least one element for limiting an angular movement of the free end when said free end is operated in the anti-clockwise direction;

- said at least one lever element comprises a one-piece body having a substantially rectilinear shape;
- said at least one lever element comprises a linking element capable of ensuring a mobile fastening of the other end of this lever element to a horn or a crown of the case;
- said at least one lever element comprises an actuation zone in particular defined on said free end, said actuation zone being capable of activating the push button of the watch by coming in contact with at least one activation zone of the middle of the case;
- the activation zone comprises a sliding member, in particular a push button, arranged in the middle capable of coming in contact with the push button of the watch as soon as the push button of this activation zone is stressed by said at least one lever element;
- the Dewar device comprises two lever elements each movably fastened to a horn of the case or to a protrusion defined on a lateral part of the case;
- said chamber is under vacuum or almost under vacuum.

BRIEF DESCRIPTION OF THE DRAWINGS

Other particularities and advantages will be clear from the description that is made thereof below, for informational and in no way limiting purposes, in reference to the following appended drawings.

DETAILED DESCRIPTION OF THE INVENTION

Figure 1:
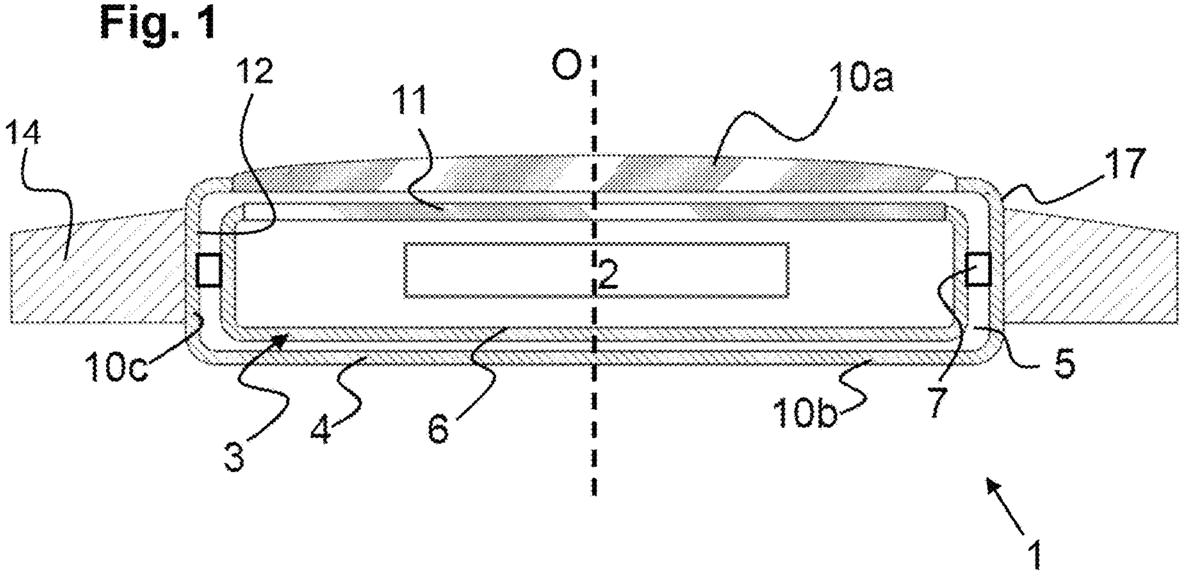
FIG. 1 is a cross-sectional view of a diagram of a Dewar device for mechanical and/or functional components of a watch provided with a device for actuating at least one push button of a watch, according to an embodiment of the invention.

FIG. 1 schematically shows an isothermal horological device 1 for mechanical and/or functional components 2 of a watch 3 also called “horological Dewar device” or “protective device” or more simply in the rest of the description “Dewar device”. Such a Dewar device 1 is capable of participating in conferring in particular good thermal insulation onto mechanical and/or functional components 2 of the watch 3, the case 6 of which is arranged in the case 4 of this device 1.

This Dewar device 1 is in particular formed by the combination of its case 4 and of the watch 3 case 6 in order to create appropriate thermal insulation for these mechanical and/or functional components 2. In this configuration, the watch 3 case 6 is arranged in a chamber 5 of the case 4 while being maintained distant or at a distance from all of the elements 10*a* to 10*c* of the case 4 defining this said chamber 5 namely the glass 10*a*, an inner peripheral wall 12 of a middle 10*c* and a back 10*b* of this case 4. It is noted that this inner peripheral wall 12 is also that of said chamber 5.

In this context, this device 1 thus comprises the case 4 which includes the middle 10*c* preferably provided with two pairs of horns 14 on which a wristlet allowing a user of this device 1 to wear it for example on the wrist is mounted. This case 4 also includes a crown, a glass 10*a* and a back 10*b* visible in FIGS. 1 to 3. In this device 1, it is noted the glass

10*a* preferably comprises a surface that is substantially greater or strictly greater than a glass 11 of the watch 3 case 6.

This case 4 also comprises a bezel which can be mounted movably in rotation relative to the middle 10*c*. Such a bezel has a substantially circular shape.

This Dewar device 1 also comprises a device 19 for actuating at least one push button of the case 6 of the watch 3 arranged in the chamber 5 of its case 4. This actuation device 19 comprises at least one lever element 15*a*, 15*b*, 15*c*, 15*d* of the case 4 which is movably mounted on this case 4. Such a lever element 15*a*, 15*b*, 15*c*, 15*d* is capable of carrying out a movement 13 relative to the case 4 in order to actuate said push button of the watch 3 case 6.

This lever element 15*a*, 15*b*, 15*c*, 15*d* comprises a one-piece rigid body having a substantially rectilinear shape. This lever element 15*a*, 15*b*, 15*c*, 15*d* comprises two ends 16*a*, 16*b*. A first end 16*a* called "free end" which is capable of coming in contact indirectly with the push button of the case 6 and a second end 16*b* called "attachment end" which is fastened/mounted movably in rotation about a fastening axis B on the case 4 of the Dewar device 1. Such a fastening axis B is defined at the point 18 of attachment to the case 4 of the lever element 15*a*, 15*b*, 15*c*, 15*d*, this fastening axis B being parallel or substantially parallel to a central axis O of the case 4 of the Dewar device 1. It is understood that this second end 16*b* is movably fastened at this attachment point 18 using a linking element 24.

In these conditions, it is understood that the free end 16*a* of this lever element 15*a*, 15*b*, 15*c*, 15*d* is thus capable of carrying out an angular movement 13 relative to the attachment end 16*b* when the lever element 15*a*, 15*b*, 15*c*, 15*d* is stressed by the user of the Dewar device 1 with the goal of activating the push button of the case 6 of the watch 3. In other words, the lever element 15*a*, 15*b*, 15*c*, 15*d* is configured to actuate said push button during a performing of an angular movement 13 of the first end 16*a* of this said at least one lever element 15*a*, 15*b*, 15*c*, 15*d* relative to the case 4 and more particularly relative to an outer peripheral wall 17 of this case 4 and thus to an outer face 23 of its middle 10*c*.

Figure 2:
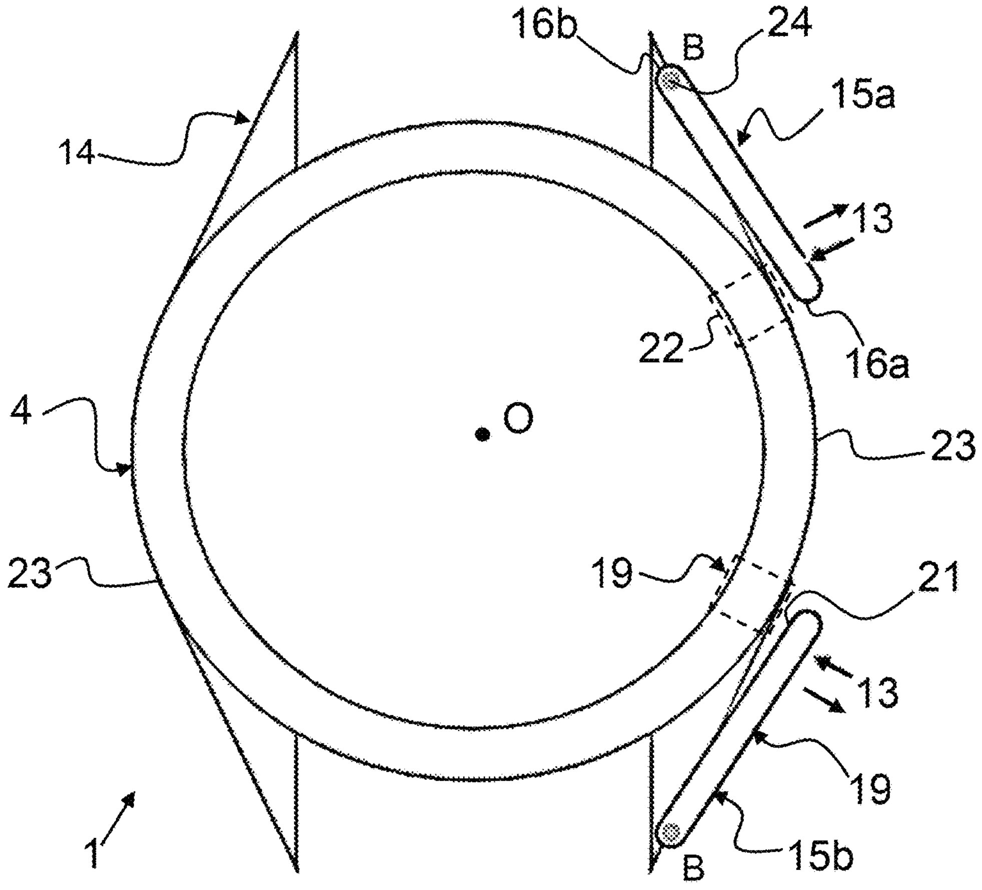
FIGS. 2 and 3 are functional diagrams describing the various operating modes relative to the implementation of the actuation device, according to the embodiment of the invention.

In FIG. 2, this actuation device 19 comprises two lever elements 15*a*, 15*b* each capable of actuating a push button of the case 6 of the watch 3. In this configuration, the second end 16*b* of each lever element 15*a*, 15*b* is fastened/mounted movably in rotation to the horn of the pair of horns 14 of said case 4. In this configuration, these lever elements 15*a*, 15*b* are movably fastened to horns of different pairs of horns 14 of the case 4.

Figure 3:
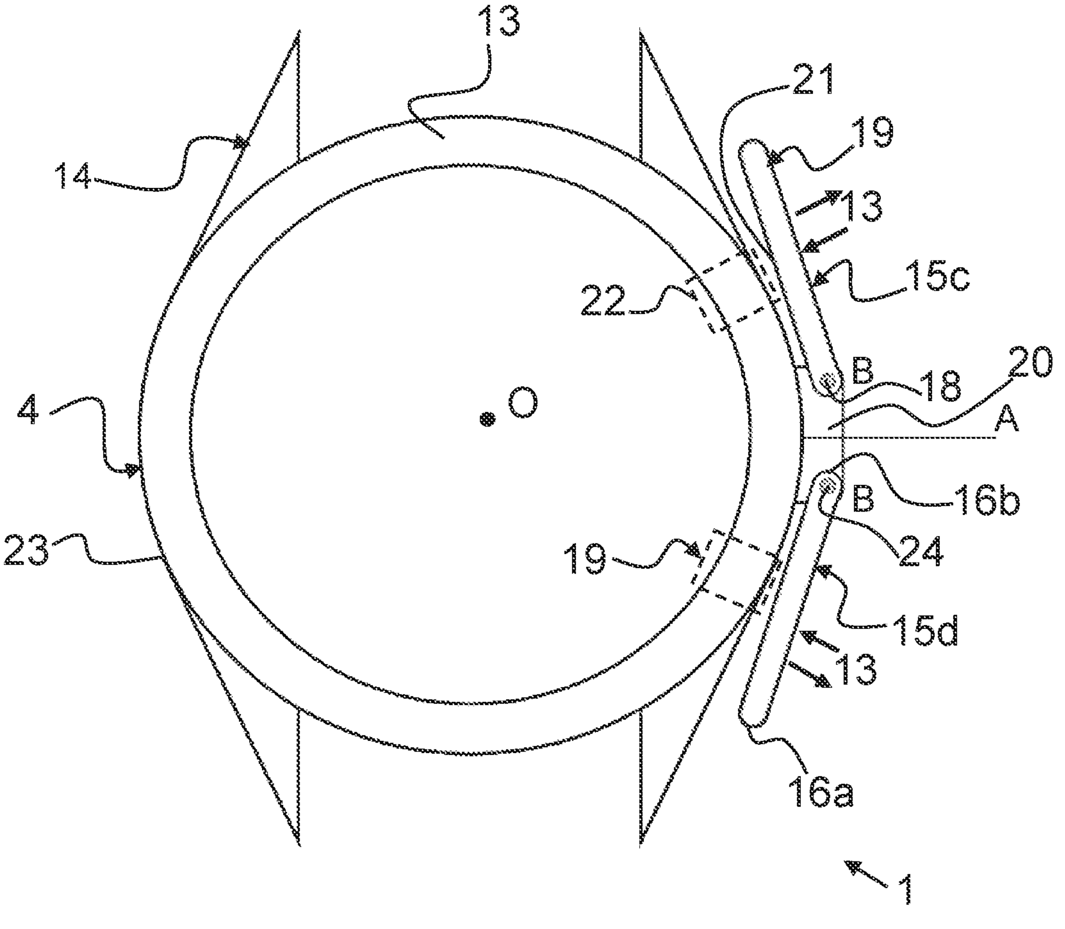

In FIG. 3, this actuation device 19 comprises two lever elements 15*c*, 15*d* each capable of actuating a push button of the case 6 of the watch 3. In this configuration, the second end 16*b* of each lever element 15*c*, 15*d* is fastened/mounted movably in rotation to the crown of said case 4. In this configuration, these lever elements 15*c*, 15*d* are movable fastened to a part 20 of the middle forming a protrusion extending radially with respect to the centre of the case 4 through which the central axis O passes. In other words, this protrusion 20 is defined on a lateral part of the case 4. These lever elements 15*c*, 15*d* are movably fastened preferably at two different attachment points 18 of this protrusion 20. It is noted that this protrusion 20 can be a crown mobile only in translation according to a direction parallel to the central axis A of this protrusion 20. This central axis A is in these conditions perpendicular or substantially perpendicular to the central axis O.

Each lever element 15*a*, 15*b*, 15*c*, 15*d* is capable of alternating between a "deactivation" state during which the lever element 15*a*, 15*b*, 15*c*, 15*d* is configured in a position in which it does not participate in actuating the push button of the watch 3 case 6 and an "activation" state during which the lever element 15*a*, 15*b*, 15*c*, 15*d* is configured in a position in which it participates in actuating this push button.

Moreover, the actuation device 19 also comprises at least one return element capable of returning the lever element 15*a*, 15*b*, 15*c*, 15*d* from a deactivation state to an activation state. Furthermore, it is noted that the actuation device 19 can comprise in this configuration an element for limiting an angular movement 13 of the lever element 15*a*, 15*b*, 15*c*, 15*d* with respect to the case 4 and thus with respect to the middle 10*c* of this case 4 when this lever element 15*a*, 15*b*, 15*c*, 15*d* is operated in an anti-clockwise direction of movement, for example by the return element.

In this actuation device 19, the lever element 15*a*, 15*b*, 15*c*, 15*d* comprises an actuation zone 21 capable of activating the push button of the watch 3 by coming in contact with at least one activation zone 22 of the middle 10*c* of the case 4. This activation is carried out as soon as this lever element 15*a*, 15*b*, 15*c*, 15*d* is operated in an angular movement 13 relative to this activation zone 22 of the middle 10*c*, this movement 13 being carried out in the clockwise direction.

Such an actuation zone 21 is defined on a part of an outer surface of the lever element 15*a*, 15*b*, 15*c*, 15*d*. This part is arranged facing a portion of the outer face 23 of the middle 10*c* where the activation zone 22 is located. This part can be comprised between the point 18 of attachment to the case 4 of this lever element 15*a*, 15*b*, 15*c*, 15*d* and its free end inclusive. For example, this actuation zone 21 can be defined at this free end 16*a*.

In this configuration, the activation of the push button of the watch 3 case 6 by the lever element 15*a*, 15*b*, 15*c*, 15*d* is indirect. Indeed, the actuation zone 21 is capable of activating the push button of the watch 3 by coming in contact indirectly with the latter, via the activation zone 22 of the middle 10*c*.

This activation zone 22 is comprised in the actuation device 19 and is configured to interact with the lever element 15*a*, 15*b*, 15*c*, 15*d*. Such an activation zone 22 can comprise a sliding member, in particular a push button arranged in the middle 10*c* and which is capable of coming in contact directly with the push button of the watch 3 as soon as this button is stressed by the actuation zone 21 of the lever element 15*a*, 15*b*, 15*c*, 15*d*. In one alternative, this activation zone 22 can be a portion of the middle 10*c* which is capable of being deformed in order to come in contact with the push button of the watch 3.

In reference to FIGS. 2 and 3, the Dewar device 1 comprises two lever elements 15*a*, 15*b*, 15*c*, 15*d* provided to activate two distinct push buttons of the case 6 of the watch 3. These two lever elements 15*a*, 15*b*, 15*c*, 15*d* are arranged near or in the vicinity of the corresponding push buttons of the case 6 with which they are intended to cooperate indirectly. For example, the first and second push buttons are arranged on a middle of the watch 3 case 6 respectively in the "2 o'clock" and "4 o'clock" zones.

Moreover, it is thus understood that this device 19 for actuating the push button of the watch 3 is activated by the lever element 15*a*, 15*b*, 15*c*, 15*d*, using the angular movement 13 of the actuation zone 21 comprised on the lever element 15*a*, 15*b*, 15*c*, 15*d* relative to the activation zone 22 comprised in the middle 10*c* of the case 4.

It is understood that such an actuation zone 19 allows to improve the use of the Dewar device 1 in particular when the user of this device 1 is not very dexterous with the part of their body that allows them to manipulate it. This lack of dexterity can result from a disability or from the fact that this user is wearing heavy gloves on their hands which prevent them from being precise with their fingers to manipulate this Dewar device 1. In this context, it is noted that such a Dewar device 1 is particularly adapted to a use by astronauts wearing their spacesuit or more generally by users/adventurers in a suit moving in environments in which there are extreme conditions in terms for example of pressure, temperature, humidity, etc.

As mentioned above, the watch 3 case 6 is arranged in the chamber 5 of the case 4 while being maintained distant or at a distance from all of the elements 10*a* to 10*c* of this case 4. This remoteness or this distance or this separation is configured using at least one device 7 for fastening the watch 3 case 6 comprised in the case 4. In other words, the fastening device 7 is configured to carry out or maintain a separation between said case 6 and all of the elements 10*a*, 10*b*, 10*c* of the case 4 forming said chamber 5 of this case 4. This fastening device 7 participates in reducing or even in eliminating any thermal conduction between the inner peripheral wall 12 of the middle 10*c* and/or the back 10*b* and/or the glass 10*a* with the watch 3 case 6 in particular with an outer global face of this case 6. This outer global face includes an upper face comprising the glass 11 of the case 6 of this watch 3, a lower face comprising a back of said case 6 and an outer peripheral wall of a middle of this case 6. It is understood that the lower and upper faces are opposite to one another. It is noted that the fastening device 7 is arranged on an inner peripheral wall 12 of the chamber of the case 4. In this configuration the fastening device 7 mechanically connects, in particular in a reversible manner, the watch 3 case 6 to the inner peripheral wall 12 of the chamber of the case 4. Moreover, the Dewar device 1 can comprise two fastening devices 7 arranged in the chamber while being opposite to one another.

It is noted that such a case 6 is comprised in a watch 3 that can be an electronic watch for example a quartz watch, or a mechanical watch.

The mechanical and/or functional components 2 of the watch 3, mentioned above, comprise in a non-limiting and non-exhaustive manner: mechanical elements of the movement such as a balance-spring, wheels, a striking-work mechanism, a dial, hands, rings, joints and/or electronic and/or electric components 2. It is noted in particular that such electronic and/or electric components 2 include for example a display device, a processor, a memory, a component for storing energy, a motor, an integrated circuit and an electronic oscillator, etc.

It is thus understood that in this configuration, this Dewar device 1 has the same properties and characteristics as a Dewar tube/flask well known in the prior art. As mentioned above, the properties and characteristics of this Dewar device 1 participate in conferring onto it good thermal insulation with regard to temperatures, in particular extreme, that can exist in the outside environment in which such a device 1 can be located.

As mentioned, the glass 10*a*, the middle 10*c* and the back 10*b* of this device 1 together define the chamber 5 of this case 4 which is capable of receiving the watch 3 case 6. These three elements 10*a* to 10*c* of the case 4 namely the middle 10*c*, the glass 10*a* and the back 10*b* can be distinct elements that are joined together to build this chamber 5. Alternatively, the middle 10*c* and the back 10*b* of the case 4 can together form a one-piece part, said one-piece part defining an opening opposite to the back 10*b* which is capable of being closed by the glass 10*a*, in a reversible and sealed manner. In one alternative, the middle 10*c* and the glass 10*a* of the watch 3 case 4 can together form a one-piece part, said one-piece part defining an opening opposite to the glass 10*a* which is capable of being closed by the back 10*b*, also in a reversible and sealed manner.

The middle 10*c* or the back 10*b* can also be like the glass 10*a* transparent elements of the case 4 of the Dewar device 1. In such a configuration, the peripheral wall 12 of the middle 10*c* and the inner face of the back 10*b* can be coated with a metallic reflective coating or similar, for example such as a layer of silver.

It is noted however that the middle 10*c* or the back 10*b* are preferably made in a non-limiting and non-exhaustive manner from a metal material or from thermosetting or thermoplastic polymer resins reinforced with carbon or glass fibres or from ceramic materials.

In addition, the device 1 can comprise an interferometric filter arranged on an outer global face of the case 4 namely on an outer peripheral wall of the middle 10*c* and/or outer faces of the glass 10*a* and of the back 10*b* of this watch 3 case 6. This interferometric filter can be a grid or a netting forming a coating on this outer global face of the case 4. This grid or netting has a mesh, the dimensions of which are such that they only let certain predetermined wavelengths of the electromagnetic spectrum pass through, typically the wavelengths of the visible range.

Moreover when the device 1 is provided to be used in an environment comprising air, the chamber 5 of the case 4 comprising the watch case 6 is under vacuum or almost under vacuum. In other words, in this chamber, the space defined between this case 6 and the inner peripheral wall 12 of the middle 10*c*, the back 10*b* and the glass 10*a* is empty of material or almost empty. It is noted that when this device 1 is used in an environment devoid of air or substantially devoid, its chamber can not be under vacuum, or on the contrary also be under vacuum or almost under vacuum.

Such a Dewar device 1, the use or the manipulation of which is facilitated via the actuation device, participates in providing the mechanical and/or functional components 2 of the watch 3 with very good thermal insulation with respect to the outside environment by reducing or even by preventing heat loss by radiation of the components arranged in the watch case 6 over a long duration. Thus, when the temperature outside the device 1 reaches extreme values, typically approximately −125 to +125° C., the temperature inside the chamber 5 remains substantially equal to the temperature present in the watch 3 case 6 during its arrangement in the case 4, typically approximately 20° C. It is noted that regardless of the temperature conditions existing in the environment of the Dewar device 1, the temperature present in the watch 3 case 6 is a temperature that does not hinder the proper operation of the watch 3. This temperature is maintained over a duration that is 5 to 18 times greater than the duration for which such a watch 3 case would be capable of preserving an operating temperature of its components 2 while being located directly in such an environment in which there are such in particular extreme temperatures (that is to say while being located outside of the case of the Dewar device). It is thus understood that such a configuration allows to protect the mechanical and/or functional components 2 of the watch 3, as well as to participate in ensuring their operation in an optimal manner in extreme outside temperature conditions.

The invention claimed is:

1. A Dewar device for mechanical and/or functional components of a watch, said watch including a watch case, said device comprising:

a wristlet;

a housing comprising a chamber, wherein said watch case is capable of being disposed in said chamber in such a way that a glass of said watch case is arranged facing a glass of a set of elements of the housing defining said chamber;

at least one fastening device fastening said watch case in said chamber of the housing while maintaining said watch case distant from all of the elements of the housing defining said chamber, and a device for actuating at least one push button of the watch by the angular movement of a free end of at least one lever element of said device relative to the housing, said at least one lever element having another end movably fastened to said housing, wherein said at least one lever element comprises a one-piece body having a substantially rectilinear shape.

2. The Dewar device according to claim 1, wherein said actuation device comprises said at least one lever element which is configured to actuate said at least one push button by angular movement of the free end of said at least one lever element relative to the housing, said at least one lever element having its other end movably fastened to said housing.

3. The Dewar device according to claim 1, wherein said other end of said at least one lever element is movably fastened to a horn of a pair of horns of said housing.

4. The Dewar device according to claim 1, wherein said other end of said at least one lever element is movably fastened to a crown of said housing.

5. The Dewar device according to claim 1, wherein said at least one lever element comprises a linking element capable of ensuring a mobile fastening of the other end of said lever element to a horn or a crown of the housing.

6. The Dewar device according to claim 1, wherein said at least one lever element comprises an actuation zone, said actuation zone being capable of activating the push button of the watch by coining in contact with at least one activation zone of a middle of the housing.

7. The Dewar device according to claim 1, wherein said at least one lever element comprises an actuation zone, said actuation zone being capable of activating the push button of the watch by coming in contact with at least one activation zone of a middle of the housing, the activation zone of the middle of the housing comprising a sliding member arranged in the middle capable of coming in contact with the push button of the watch as soon as the sliding member of said activation zone of the middle of the housing is stressed by said at least one lever element.

8. The Dewar device according to claim 1, further comprising two lever elements each movably fastened to a horn of the housing or to a protrusion defined on a lateral part of the housing.

9. The Dewar device according to claim 1, wherein said chamber is under vacuum or almost under vacuum.

10. A Dewar device for mechanical and/or functional components of a watch, said watch including a watch case, said device comprising:

a wristlet;

a housing comprising a chamber, wherein said watch case is capable of being disposed in said chamber in such a way that a glass of said watch case is arranged facing a glass of a set of elements of the housing defining said chamber;

at least one fastening device fastening said watch case in said chamber of the housing while maintaining said watch case distant from all of the elements of the housing defining said chamber, and a device for actuating at least one push button of the watch by the angular movement of a free end of at least one lever element of said device relative to the housing, said at least one lever element having another end movably fastened to said housing, wherein said other end of said at least one lever element is movably fastened to a horn of a pair of horns of said housing.

11. The Dewar device according to claim 10, wherein said at least one lever element comprises a linking element capable of ensuring a mobile fastening of the other end of said lever element to the horn.

12. The Dewar device according to claim 10, wherein said at least one lever element comprises an actuation zone, said actuation zone being capable of activating the push button of the watch by coming in contact with at least one activation zone of a middle of the housing.

13. The Dewar device according to claim 10, wherein said at least one lever element comprises an actuation zone, said actuation zone being capable of activating the push button of the watch by coming in contact with at least one activation zone of a middle of the housing, the activation zone comprising a sliding member arranged in the middle capable of coming in contact with the push button of the watch as soon as the sliding member of said activation zone is stressed by said at least one lever element.

14. The Dewar device according to claim 10, wherein said chamber is under vacuum or almost under vacuum.

* * * * *